US 8,620,512 B2

(12) United States Patent
Kernwein

(10) Patent No.: US 8,620,512 B2
(45) Date of Patent: *Dec. 31, 2013

(54) METHOD FOR TRACKING DEFECTIVE FUNCTIONS IN OPERATION OF MOTOR VEHICLES

(76) Inventor: Markus Kernwein, Bretten-Büchig (DE)

( * ) Notice: Subject to any disclaimer, the term of this patent is extended or adjusted under 35 U.S.C. 154(b) by 1324 days.

This patent is subject to a terminal disclaimer.

(21) Appl. No.: 11/899,896

(22) Filed: Sep. 7, 2007

(65) Prior Publication Data

US 2009/0076680 A1    Mar. 19, 2009

(30) Foreign Application Priority Data

Sep. 12, 2006   (DE) .......................... 10 2006 042 643

(51) Int. Cl.
  *G01M 15/00*    (2006.01)
  *G01M 15/05*    (2006.01)
  *G06F 17/00*    (2006.01)
  *G06F 19/00*    (2011.01)

(52) U.S. Cl.
  USPC ......... 701/29.1; 701/32.1; 701/33.4; 340/439

(58) Field of Classification Search
  USPC ............. 701/1, 29, 31, 34, 35, 36, 29.1, 29.2, 701/29.4, 39.1, 32.1, 32.7, 33.4, 33.6, 33.7, 701/33.8, 33.9; 340/425.5, 438, 439, 449, 340/500, 588, 635
  See application file for complete search history.

(56) References Cited

U.S. PATENT DOCUMENTS

| 5,774,645 | A | 6/1998 | Beaujard et al. |
| 7,234,430 | B2 | 6/2007 | Toedter et al. |
| 2002/0087578 | A1 | 7/2002 | Vroman |
| 2002/0183866 | A1 | 12/2002 | Dean et al. |

FOREIGN PATENT DOCUMENTS

| DE | 3914446 A1 | 11/1990 |
| DE | 198 37 214 A1 | 8/1998 |
| DE | 199 30 311 C1 | 7/1999 |
| DE | 601 10 444 T2 | 12/2001 |
| EP | 0640763 B1 | 7/1994 |
| EP | 0809021 B1 | 5/1997 |
| EP | 1321668 B1 | 6/2003 |
| FR | 2656439 A1 | 12/1989 |

OTHER PUBLICATIONS

"Das elektronisch gesteuerte Glühsystem ISS für Dieselmotoren" published in DE-Z MTZ Motortechnische Zeitschrift 610 (2000) 10, S.668-675.

*Primary Examiner* — Thomas Tarcza
*Assistant Examiner* — Edward Pipala
(74) *Attorney, Agent, or Firm* — Keith H. Orum; Orum & Roth, LLC

(57) ABSTRACT

A method for tracking defective functions in the operation of heater plugs in a diesel engine of a vehicle, provided with a control unit for the control of its heater plugs—the preheater control unit—, by monitoring at least one operating parameter of the heater plugs and/or of the preheater control unit, generating a fault message when the operation parameter so monitored deviates from a predefined nominal value or nominal state of the operating parameter, and storing the fault message. The invention links the fault message to a time parameter, stores the fault message together with the time parameter, searches for further fault messages that are stored in the vehicle and linked to the same time parameter, and combines the fault messages that are linked to the same time parameter.

29 Claims, 1 Drawing Sheet

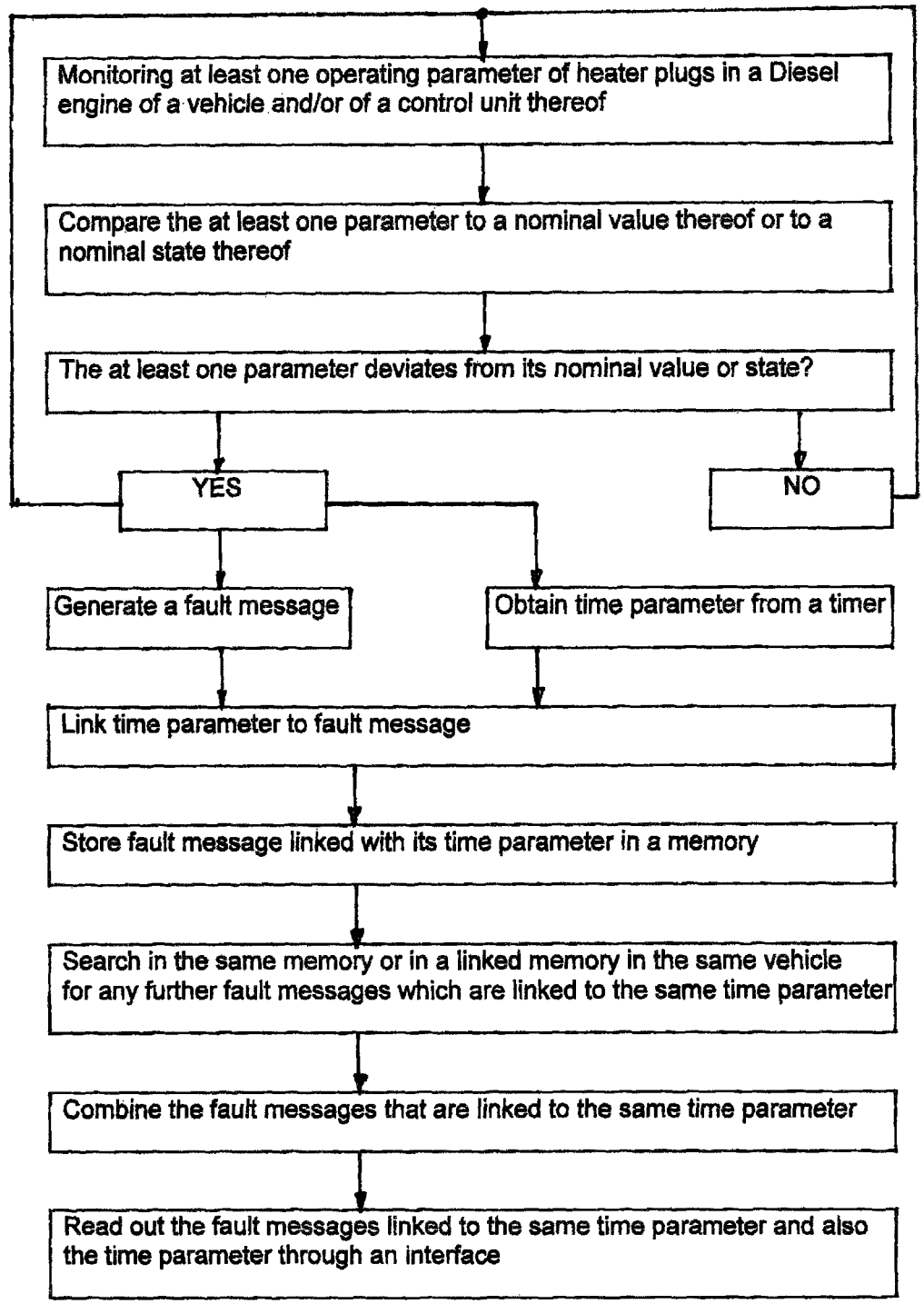

METHOD FOR TRACKING DEFECTIVE FUNCTIONS IN OPERATION OF MOTOR VEHICLES

BACKGROUND OF THE INVENTION

1. Field of the Invention

The present invention relates to a method for tracking defective functions in the operation of heater plugs in a diesel engine of a vehicle, provided with a control unit for the control of its heater plugs—the preheater control unit—by the steps of
monitoring at least one operating parameter of the heater plugs and/or of the preheater control unit;
generating a fault message when the operating parameter so monitored devates from a predefined nominal value or nominal state of the operating parameter;
and storing the fault message.

2. Description of Related Art

From MTZ Motortechnische Zeitschrift 61 (2010), pp. 668 to 675, "Das elektronisch gesteuerte Gühsystem ISS für Dieselmotoren (The electronically controlled ISS preheater system for diesel engines)", there has been known a control unit for heater plugs of a diesel engine, hereinafter referred to as preheater control unit, the essential components of which consist of a microprocessor for the control of all functions, a plurality of MOSFET power semiconductors for switching the different heater plugs on and off, an electric interface for communication with the engine control and an internal power supply for the microprocessor and the interface. The microprocessor controls the power semiconductors, reads their state information and communicates with the engine control via the electric interface. The interface serves the function to condition the signals required for communication between the engine control and the microprocessor. The preheater control unit preferably is mounted directly on the engine.

The heater plugs within the ISS preheater system are individually driven by the power semiconductors. This allows selective diagnosis and protective functions to be realized. An overcurrent detection unit interrupts the respective preheat circuit when excessive load currents are encountered, for example due to a short-circuit. When the power semiconductors assume an inadmissibly high temperature, due to self-heating or excessively high environmental temperature, the circuit is interrupted whereby destruction of the power semiconductor is prevented. An open load circuit can be detected as well. All that state information can be transmitted to the engine control, just as the electric power consumed by the preheater system.

Any faults encountered can be reported, once detected, to the engine control unit by the ISS preheater system and can be stored in a fault memory of the engine control unit. In addition, the preheater control unit comprises a fault memory that counts the number of times a fault occurs.

The entries in the fault memory of the engine control unit can be read out using a diagnosis computer that is connected to a diagnosis interface of the vehicle in a workshop. The fault memory of the preheater control unit can be read out either via the same interface or by directly contacting the preheater control unit via a special tool. The faults indicated are to provide the workshop personnel with information as to whether and where the preheater control unit may need to be repaired or to be exchanged or if any heater plugs should be exchanged. Further, it is the intention to assist subsequent analysis carried out by the supplier of the motor vehicle and/or by the supplier of the preheater control unit.

BRIEF SUMMARY OF THE INVENTION

Now, it is the object of the present invention to facilitate detection of faults and causes of faults in connection with the operation of heater plugs.

That object is achieved by a method having the features defined in claims 1 and 2. Advantageous further developments of the invention are the subject-matter of the subclaims.

BRIEF DESCRIPTION OF THE SEVERAL VIEWS OF THE DRAWING(S)

Please see new FIG. 1, showing a flow diagram of the invention.

DETAILED DESCRIPTION OF THE INVENTION

According to the invention, defective functions in the operation of heater plugs are tracked in a diesel engine, provided with a control unit for the control of its heater plugs, also described as a preheater control unit, by the steps of:
Monitoring at least one operating parameter of the heater plugs and/or the preheater control unit;
generating a fault message when the operating parameter so monitored deviates from a predefined nominal value or nominal state of the first operating parameter; and
storing the fault message in a fault memory and, if desired, inquiring the stored fault message via a diagnosis interface.

Fault messages that relate to the operating parameters being monitored are stored for this purpose linked to a time parameter. The time parameter provides a direct or indirect indication of the time the fault occurred so that the fault message stored gives an indication not only of the kind of the fault but also of the time the fault occurred. In this latter respect, it is not necessary to know the exact time and date, although this is likewise possible within the scope of the invention if the vehicle is provided with a timer for supplying a corresponding time signal in an electronically storable form; a radio clock would be suitable, for example, for use as such a timer. For purposes of the invention, it is sufficient if the fault messages are linked to a time parameter of a kind that makes it possible to determine whether a plurality of faults reported in relation to different or the same operating parameters have occurred simultaneously. Although a universal standard time may of course be used for that purpose, a relative, individually determined time base, related to the particular vehicle and consisting for example of
the operating time of the preheater control unit,
the operating time of the engine control unit, if the latter is linked to the preheater control unit,
the electric signal of a mileage counter,
or the electric signal of a counter that counts the revolutions of a crankshaft or of a camshaft of the engine,
may well serve the purpose. The time parameter is stored linked to the fault message and can be read out together with the fault message via a diagnosis interface.

Preferably, at least one further operating parameter is monitored and a fault message is produced when the further operating parameter so monitored differs from its predefined nominal value or nominal state. The further fault message is likewise stored linked to a time parameter, the time parameter being selected to be the same for the first and every further operating parameter being monitored. This makes it possible to find out among the fault messages for identical or different operating parameters, that have been linked to the same time parameter, those messages that relate to faults that occurred simultaneously. The scan is carried out according to the invention, and the fault messages found out in this may are combined. When different faults have occurred at the same time, this way provides an indication of functional interrelations or causal interrelations between the faults that occurred simultaneously, which facilitates both the diagnosis of the cause of the fault and its repair.

According to the invention it is possible to combine not only different faults that have been reported simultaneously, but also messages relating to one and the same fault that have been detected by different units. To see that the fault has been detected by different units may likewise be helpful in determining and remedying the cause of the fault.

Further, it is helpful if the system, instead of merely registering the occurrence of one fault or a plurality of faults, inquires further parameters, preferably all parameters being monitored, when a fault occurs and stores them together with the same time parameter as the fault encountered, so that the remaining operating parameters can be considered in a subsequent analysis even though they may not have given rise to a fault message (claim 2). For purposes of fault analysis, the information available then relates not only to the fault as such, but also to the momentary conditions of its "environment" which is represented by the further operating parameters being monitored.

Fault diagnosis may be facilitated if the occurrence of a fault can be regarded in the context of simultaneously ascertained state information for additional parameters, especially when the messages taken into consideration are supplied by a unit different from the one that supplied the fault message as such. For example, it may make sense to regard the fault message supplied by the preheater control unit in combination with messages supplied by an engine control unit.

The status of several, preferably of all, operating parameters being monitored can be inquired repeatedly at regular intervals. Preferably, however, not every status of the operating parameters being monitored that is inquired will also be stored. Instead, the value or state of the operating parameters being monitored preferably is stored only when an operating parameter is found to deviate from its predefined normal value or normal state, and when that deviation is classified as a fault.

There is, however, also the possibility to monitor the different operating parameters not simultaneously, but rather individually at different points in time. When a fault is then found to exist in an operating parameter, this fact may be used as a trigger for rapidly recording and storing the value or state of the remaining operating parameters, which latter will then be linked to the same time parameter to which the fault message had been linked. For purposes of the present invention "rapidly" is meant to describe a time interval between the fault message and the inquiry of another operating parameter that is short enough to permit the assumption that the further operating parameter did not substantially change during that time interval. A change would be a substantial change if the changed value or state of the operating parameter would not allow any conclusion as to what value or state the further operating parameter had at the time of the fault message.

Inquiring the further operating parameters is especially meaningful when a further fault is detected that can be associated to the first fault message. Preferably, however, the recorded further operating parameters will be stored irrespective of whether or not a further fault occurred in connection with the same parameters, in order to permit a fault message to be considered in the context of the status of the further operating parameters.

If further operating parameters are inquired in the case of a fault message, such inquiry need not necessarily relate to all the operating parameters being monitored. Rather, the inquiry may be limited to selected operating parameters. Preferably, the selection would be such that the operating parameters being inquired are those that are functionally related to the operating parameter with respect to which a fault has been detected. Such a selection can be made from the very beginning for each operating parameter, and can be stored in a control unit. Such selection can be used in cases where the operating parameters being monitored are generally recorded at regular intervals and simultaneously one with the other or rapidly one after the other, and also in cases where they are recorded only when a fault message occurs, and then simultaneously with that message or rapidly thereafter.

Operating parameters that may be considered in connection with the operation of heater plugs of a diesel engine are, among others, the current intensity with which the heater plugs are supplied;
the supply voltage available;
the internal resistance of the heater plugs;
the temperature of the heater plugs;
the resistance of the supply lines to the heating resistor of the heater plugs;
the temperature in the preheater control unit; and
the temperature of power semiconductors through which the heater plugs are supplied with current.

Further operating parameters can be added as required. For example, when an inadmissibly high temperature in the preheater control unit and an inadmissibly high temperature of a power semiconductor are determined simultaneously, it can be concluded that the high temperature in the preheater control unit is a result of the inadmissibly hot power semiconductor. When an inadmissibly high temperature of a power semiconductor and an inadmissible variation of the internal resistance of the associated heater plug occur at the same time, this may be taken as an indication that the high temperature of the power semiconductor has its cause in a defective heater plug.

An especially advantageous embodiment of the invention is one where fault messages relating to the operation of the heater plugs and of the preheater control unit are linked to fault messages that relate to further operating parameters of the engine and/or of auxiliaries of the engine, for example a fuel injection system or a charge air compressor, i.e. parameters connected with the engine control. Engine control is ensured by an engine control unit which, contrary to a preheater control unit, usually is not mounted on the engine directly, but is installed in a protected area near the engine splash wall or in the passenger compartment of the vehicle, below the instrument panel. The engine control unit not only has regulating and control tasks different from those of the preheater control unit, but also has the particular property, compared with the preheater control unit, that the cyclical programs of the engine control unit operate not only at fixed points in time, but also in synchronism with the engine speed. The input signals that are processed by an engine control unit for purposes of its control and regulating tasks include signals from sensors that provide information on, for example, the speed of the crankshaft and of the camshaft,
the angular position of the crankshaft and of the camshaft,
the position of a throttle valve,
the throughput of intake air, the temperature of the intake air,
the cooling water temperature of the engine,
the position of the vacuum actuator of an exhaust gas turbocharger,
the environmental air pressure,
the pressure of the fuel in a fuel injection system,
the composition of the exhaust gas,
the pressure in the cylinders of the engine,
any knocking of the engine.

All these operating parameters can be included in the monitoring program, and any faults occurring in any operating parameter can be linked to a time parameter and can be stored and read out together with the latter. As the invention provides that the time parameter linked to the fault messages and stored together with them always is the same, any fault messages occurring with respect to all these operating parameters can be investigated to see if the faults occur simultaneously, and any fault messages relating to faults that occur simultaneously in the operating area of the preheater control unit and in the operating area of the engine control unit can be taken as an indication of an inherent relationship, a common cause of the fault and of related effects of the faults although the latter occur in different operating areas, namely in the operating area of the preheater control unit and in the operating area of the engine control unit.

In the case of a fault message issued by the preheater control unit, when an operating parameter of the preheater control unit deviates from its normal value or its normal state, the engine control may, especially, generate an entry in that fault memory, where current operating states are filed that are known to the engine control only, not to the preheater control unit, as for example the rail pressure in the fuel injection system or the vehicle speed. The entry in the fault memory of the engine control unit is linked to the same time parameter as the entry in the fault memory of the preheater control unit and can therefore be associated to the latter. By combining the entries in the fault memories of the preheater control unit and of the engine control unit one obtains a detailed image of the environmental conditions that existed at the time the fault occurred. This facilitates the effort of locating the cause of the fault and, especially, any corrective action. Correspondingly, other operating parameters can likewise be controlled, and if necessary stored and linked to the time parameter of the entry in the fault memory, by further control units of the vehicle, for example by an on-board computer, in order to permit such parameters to be included in the method according to the invention.

It is an advantage that the action of combining the fault messages, relating to faults that occur simultaneously, does not require that the fault information be exchanged between the preheater control unit and the engine control unit and perhaps some other control unit. Instead, it is sufficient if the fault information obtained in the operating field of the preheater control unit and, preferably, any faultless operating data obtained simultaneously or with little delay in the preheater control unit, as well as the fault information and operating data obtained in the operating field of the engine control unit are stored in the engine control unit. If further operating parameters are monitored by a third control unit, then the fault data and the faultless operating data recorded by that unit can be stored and linked to a time parameter in that third control unit. It only has to be ensured that the preheater control unit, just as the engine control unit, and a third control unit that may be integrated, link the same time parameter to the fault data to be stored. That time parameter, for example the current counter reading of an electronic mileage counter, or the current counter reading of a crankshaft revolution counter, may be supplied to the engine control unit, the preheater control unit and a third control unit, that may be included, via a bus system installed in the vehicle to which the control units are connected and which comprises a diagnosis interface for connection of a diagnosis computer.

Preferably, several different operating parameters are monitored in each of the control units, especially in the preheater control unit and the engine control unit, for being linked to the time parameter and stored when a fault occurs. The more different operating parameters are monitored, the greater is the probability that simultaneous fault messages may occur with respect to two or more than two operating parameters. This makes it easier to estimate the effects of faults and to find the cause of faults.

It is preferred that the fault messages relating to the operation of heater plugs and of the preheater control unit be stored only in the preheater control unit. Any fault messages occurring in the operating field of the engine control unit are preferably stored in the engine control unit only. It is not necessary for purposes of fault diagnosis to exchange the respective fault messages between the preheater control unit and the engine control unit. Adjustments between the two units, which otherwise would be necessary for that purpose, are no longer required. The fault messages stored in the preheater control unit and in the engine control unit can be searched, found, read out and analyzed via a common interface. Preferably, the common interface is part of a bus system which is installed in the vehicle and to which are connected the engine control unit as well as further control units, such as the preheater control unit.

There is, however, also the possibility to store individual or all fault messages of the preheater control unit in the engine control, in addition to storing them in the preheater control unit. One thereby obtains a more precise picture of the environment of the respective fault.

Preferably, the fault messages relating to faults that occurred simultaneously, are combined only in a diagnosis unit, for example in a diagnosis computer of the kind available in any garage, which is connected to a common interface. In the diagnosis unit, the fault messages relating to faults that occurred simultaneously can then be investigated for the purpose of finding a causal interrelation.

Once a diagnosis unit and/or a diagnosis computer have been connected, the decision whether a search for faults that occurred simultaneously should be conducted or the fault messages stored in the fault memories should be scanned, regardless of whether the faults have occurred simultaneously or not simultaneously, may be left to a selection to be made manually. Preferably, however, the method is carried out in such a way that any faults that have occurred simultaneously will be displayed automatically when reading out the stored fault messages. There may be provided for this purpose a control system in one of the connected control units, especially in the preheater control unit or in the engine control unit, which initiates the automatic search for faults that have been stored as having occurred simultaneously in the preheater control unit and/or in the engine control unit and/or in a further control unit that may possibly be integrated, upon receipt of a signal that prepares or triggers the readout process. Such a control unit can be realized, for example, by corresponding software in a microprocessor, in a microcontroller or in an ASIC being part of the preheater control unit or of the engine control unit or of another control unit. The automatic solution provides the advantage than even garage personnel not thoroughly acquainted with diagnosis processes will be warned automatically that the fault messages displayed, or part of the fault messages displaced, relate to faults that occurred simultaneously.

The simultaneous display of the time of occurrence may provide the garage personnel with additional valuable information. As has been explained before, the term "time of occurrence" means not only the precise time, but also a relative time, for example the reading time of a mileage counter, at which faults have occurred simultaneously or, when the same faults occurred more frequently, at which they occurred for the first time and for the last time.

For purposes of the present invention, faults are not only considered to have occurred "simultaneously" when they occurred exactly at one and the same point in time. Instead, it is convenient to define "simultaneity" as occurrence within a period of time of predefined limited duration or within an section of the selected time parameter of predefined limited duration. Depending on the kind of operating parameter being monitored it may be of advantage to select the duration of the section of the time parameter that is still to be regarded as "simultaneous" either depending on the kind of operating parameters being monitored, or independently thereof. For the operating parameter "temperature in the preheater control unit", for example, the period of time selected with respect to simultaneity may, for example, lie in the range of seconds, the temperature varying only slowly in that unit.

For the operating parameter "current intensity", for example, the period of time selected with respect to simultaneity may by shorter than one second, the current intensity being a highly dynamic value.

The method according to the invention, that allows tracking of defective functions in the operation of heater plugs of a diesel engine, can be generalized. Correspondingly, other defective functions occurring in operation of motor vehicles, that are driven by a combustion engine or that are equipped with a hybrid drive, i.e. that can be driven by both a combustion engine and an electric motor, can be tracked as well. And motor vehicles using a petrol engine also have a motor control unit for monitoring and controlling different operating parameters, may be also an on-board computer, an ABS control unit, a transmission control unit, an air condition control unit, a tire pressure control unit, etc. In those cases as well there may be interdependencies and interrelations that can be detected by combining fault messages and state messages supplied by different control units, for example in cases where the cause of an electric voltage drop has to be found out. In that sense, claim 28 is to be understood as a generalization of claim 1, claim 29 as a generalization of claim 2.

The invention claimed is:

1. Method for tracking defective functions in the operation of heater plugs in a diesel engine in a vehicle, provided with a control unit for the control of its heater plugs, the preheater control unit, comprising:
    monitoring at least one operating parameter of the heater plugs and/or of the preheater control unit;
        generating a fault message during any period of operation when the operating parameter so monitored deviates from a predefined nominal value or nominal state of the operating parameter;
            storing the fault message in the vehicle during any period of operation,
    linking the fault message to a time parameter during any period of operation;
    storing the linked fault message/time parameter in the vehicle during any period of operation;
    searching for further fault messages that are stored in the vehicle and linked to the same time parameter; and
    combining the fault messages that are linked to the same time parameter.

2. The method as defined in claim 1, further comprising combining fault messages relating to a first operating parameter and to at least one further operating parameter, which are linked to the same time parameter.

3. The method as defined in claim 1, further comprising combining fault messages relating to the same fault and which are stored in different units.

4. The method as defined in claim 1, further comprising when a fault message occurs, recording further operating parameters of the vehicle, linking said further operating parameters to the same time parameter as the fault message, storing and combing said further operating parameters with the respective fault message during the search for further fault messages.

5. The method as defined in claim 4, further comprising independently storing the collected further operating parameters whether or not a further fault has occurred with respect to them.

6. The method as defined in claim 4, further comprising combining the fault message with fault messages relating to further operating parameters that have been recorded in a different unit of the vehicle than the fault to which the message relates.

7. The method as defined in claim 1, further comprising collecting the values and/or states of at least some of the operating parameters being monitored simultaneously or nearly simultaneously with the recorded fault and storing said values and/or states linked to the same time parameter.

8. The method as defined in claim 1, further comprising collecting the values and/or states of at least some of the operating parameters being monitored generally simultaneously or nearly simultaneously after the recorded fault and storing said values and/or states linked to the same time parameter, at least when a fault is determined with respect to any of the operating parameters.

9. The method as defined in claim 1, further comprising monitoring not only operating parameters of the heater plugs and of the preheater control unit, but also operating parameters that are monitored by or in an engine control unit.

10. The method as defined in claim 9, further comprising monitoring a plurality of different operating parameters in the engine control unit.

11. The method as defined in claim 1, further comprising monitoring at least one operating parameter of the engine and/or of auxiliaries of the engine in addition and generating a further fault message when the operating parameter of the engine or of an auxiliary unit of the engine, being monitored, deviates from a predefined nominal value or nominal condition,
    that the further fault message relating to an operating parameter of the engine and/or of one of its auxiliaries is stored linked to the same time parameter as the one used for the first parameter and is included in the search for faults that have occurred simultaneously.

12. The method as defined in claim 1, further comprising monitoring a plurality of different operating parameters in the preheater control unit.

13. The method as defined in claim 1, further comprising storing the fault messages relating to the operation of the heater plugs and of the preheater control unit in the preheater control unit.

14. The method as defined in claim 1, further comprising storing the fault messages, that relate to the operating parameters of the engine and of its auxiliaries, in the engine control unit.

15. The method as defined in claim 1, further comprising searching messages linked to the same time parameter via a common interface.

16. The method as defined in claim 15, further comprising arranging the common interface in a bus system to which are connected the units, such as the preheater control unit and the engine control unit, by which or in which the operating parameters are monitored.

17. The method as defined in claim 1, further comprising combining the messages that are linked to the same time parameter only in a diagnosis unit which is connected to one or more interfaces of the vehicle, especially to a common interface.

18. The method as defined in claim 1, further comprising investigating fault messages linked to the same time parameter in the diagnosis unit for determining a causal interrelation.

19. The method as defined in claim 1, further comprising treating two messages as having occurred simultaneously when they occur within a time parameter section of predefined limited duration.

20. The method as defined in claim 19, further comprising selecting the duration of the time parameter section independently of the kind of the operating parameter being monitored.

21. The method as defined in claim 19, further comprising selecting the duration of the time parameter section depending on the kind of the operating parameter being monitored.

22. The method as defined in claim 1, further comprising using the time parameter which is the operating time of an engine control unit or the operating time of the preheater control unit.

23. The method as defined in claim 1, further comprising using the time parameter which is the reading of the mileage counter of the vehicle.

24. The method as defined in claim 1, further comprising using the time parameter which is the number of revolutions of a crankshaft or a camshaft of the engine.

25. The method as defined in claim 1, further comprising reading out stored fault messages and automatically displaying any faults that have occurred simultaneously.

26. The method as defined in claim 25, further comprising providing a control unit in the preheater control unit or in the engine control unit, which upon receipt of a signal preparing or triggering the readout process starts the automatic search for faults that have been stored in the preheater control unit and/or in the engine control unit as having occurred simultaneously.

27. Method for tracking defective functions in the operation of heater plugs in a diesel engine in a vehicle, provided with a control unit for the control of its heater plugs, the preheater control unit, comprising:
   monitoring at least one operating parameter of the heater plugs and/or of the preheater control unit;
   monitoring further operating parameters of the vehicle;
   generating a fault message during any period of operation when an operating parameter so monitored deviates from a predefined nominal value or nominal state of the operating parameter;
   storing the fault message in the vehicle during any period of operation;
   linking the fault message to a time parameter during any period of operation;
   storing the linked fault message/time parameter in the vehicle during any period of operation;
   linking the values or states of the remaining operating parameters being controlled to the same time parameter as the fault message;
   storing the values or states jointly described as state information, of the other operating parameters being monitored, that have been collected simultaneously or nearly simultaneously, together with the time parameter during any period of operation;
   searching for messages that are linked to the same time parameter;
   combining the fault message from a first unit with the messages from another unit that are linked to the same time parameter as the fault message from the first unit.

28. Method for tracking defective functions in the operation of motor vehicles that are driven by a combustion engine or by a hybrid drive, comprising:
   monitoring at least one operating parameter of the vehicle;
   generating a fault message during any period of operation when the operating parameter so monitored differs from a predefined nominal value or nominal state of the operating parameter;
   storing the fault message in the vehicle during any period of operation;
   linking the fault message to a time parameter during any period of operation;
   storing the linked fault message/time parameter in the vehicle during any period of operation;
   searching for further fault messages that are stored in the vehicle, linked to the same time parameter; and
   combining the fault messages that are linked to the same time parameter.

29. Method for tracking defective functions in the operation of motor vehicles that are driven by a combustion engine or by a hybrid drive, comprising:
   monitoring a plurality of operating parameters of the vehicle;
   monitoring further operating parameters of the vehicle;
   generating a fault message during any period of operation when an operating parameter so monitored differs from a predefined nominal value or nominal state of the operating parameter;
   storing the fault message in the vehicle during any period of operation;
   linking the fault message to a time parameter during any period of operation;
   storing the linked fault message/time parameter in the vehicle during any period of operation;
linking the values or states of the remaining operating parameters being monitored to the same time parameter as the fault message during any period of operation;
storing in the vehicle the values or states, jointly described as state informations, of the other operating parameters being monitored, that have been recorded simultaneously or within short delay, together with the time parameter during any period of operation;
searching for fault messages that are linked to the same time parameter;
combining the fault message from a first unit of the vehicle with the messages from another unit of the vehicle that are linked to the same time parameter as the fault message from the first unit.

* * * * *